Aug. 13, 1929.                    W. EVERSON                    1,724,754
                                   VEHICLE
                            Filed Feb. 21, 1927            2 Sheets-Sheet 1
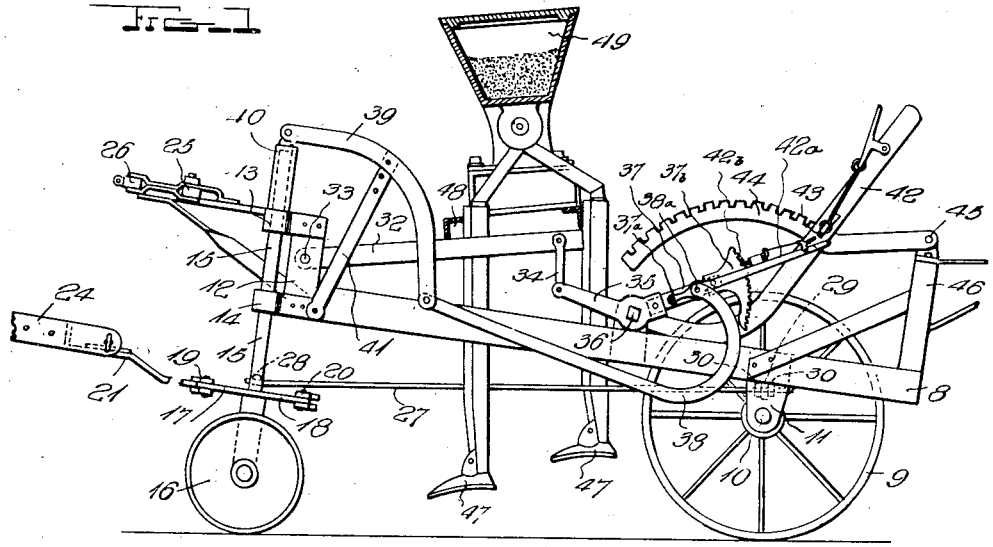
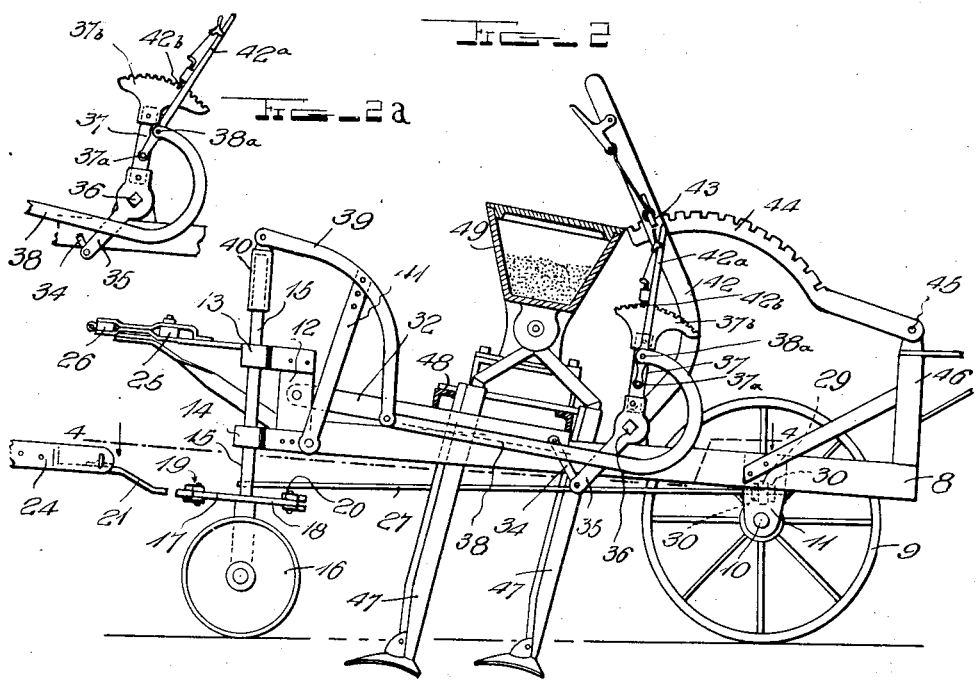
Inventor
William Everson,
By H. B. Wilson &co
Attorneys
Witness

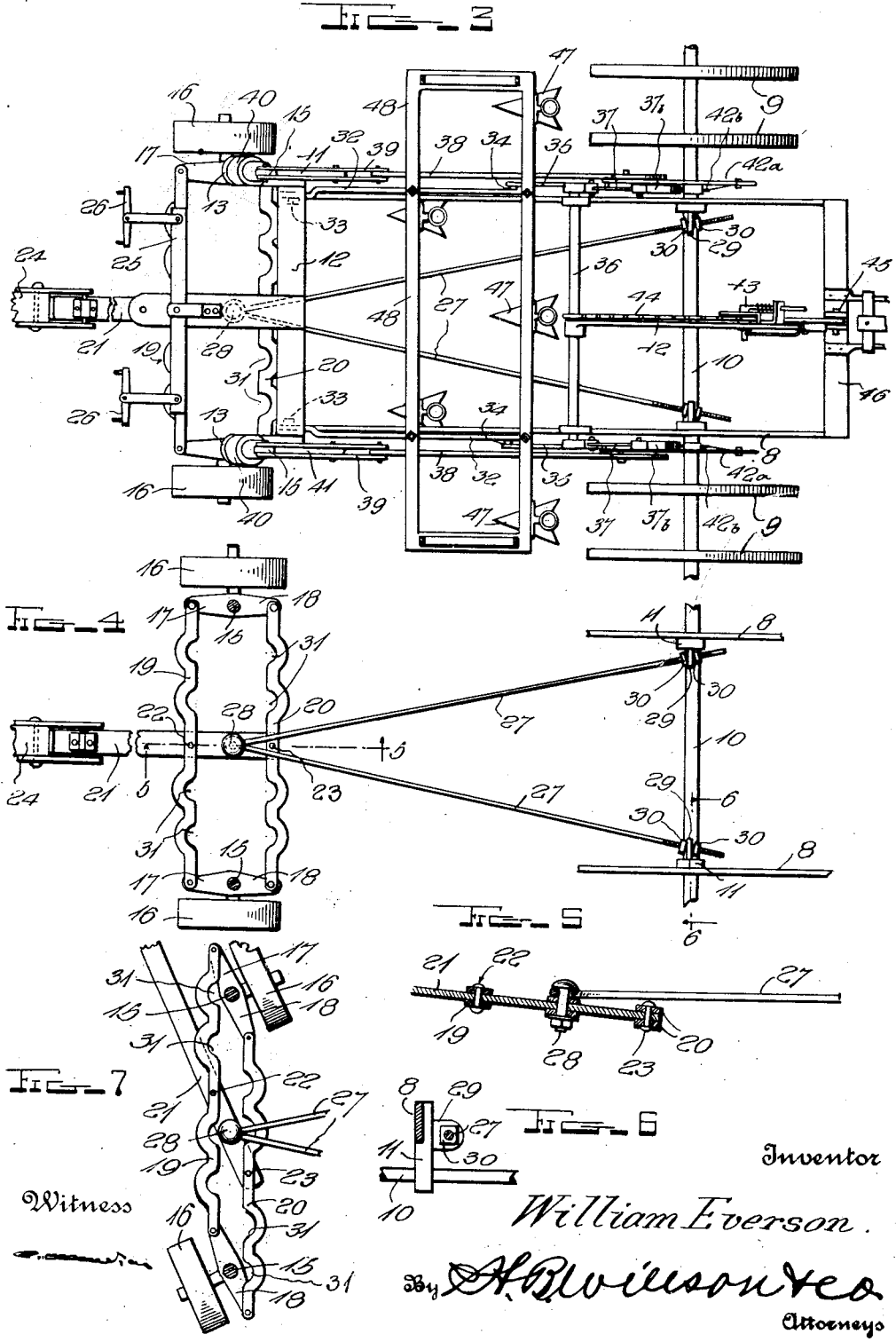

Patented Aug. 13, 1929.

1,724,754

UNITED STATES PATENT OFFICE.

WILLIAM EVERSON, OF ALMA, NEBRASKA.

VEHICLE.

Application filed February 21, 1927. Serial No. 169,927.

The invention relates to front structures for land vehicles, which structures embody front wheels and steering means therefor, and said invention is designed primarily for use with combined seeding and fallowing machines, as herein disclosed.

It is the principal object of the invention to provide a new and improved front construction in which there is no necessity of providing the frame of the machine with any axle, the construction however being such that effective steering of the front wheels may be accomplished.

The front wheels support a pair of vertical standards which are rotatable in bearings carried by the front end of the frame, these standards are provided with both forwardly and rearwardly projecting steering arms connected by transverse tie-bars, and a central longitudinal bar is pivoted to these tie-bars and projects forwardly therefrom to be steered either by a leading machine or by a team, and it is a further object of the invention to provide novel means whereby forward displacement of the lower portions of the standards, the tie-bars and associated parts, is effectively prevented, preventing possible bending of said standards.

Yet another aim is to provide construction which, while being rather simple and inexpensive, will be very efficient, durable and in every way desirable.

With the foregoing in view, the invention resides in the novel subject matter hereinafter described and claimed, the description being supplemented by the accompanying drawings.

Figs. 1 and 2 are side elevations partly in section, showing the frames respectively raised and lowered.

Fig. 2ª is a detail elevation similar to a portion of Fig. 2, but showing different positions of certain parts.

Fig. 3 is a top plan view.

Fig. 4 is a horizontal section as indicated by line 4—4 of Fig. 2.

Fig. 5 is a detail longitudinal section on line 5—5 of Fig. 4.

Fig. 6 is a detail sectional view on line 6—6 of Fig. 4.

Fig. 7 is a view similar to a portion of Fig. 4 but illustrating the manner in which short turning may be effected.

In the drawings above briefly described, the numeral 8 designates a main substantially horizontal frame whose rear end is supported by wheels 9, an axle 10 and bearings 11 for said axle, said bearings being secured to the frame. At its front end, the frame 8 is provided with a rigid transverse frame 12 disposed vertically, the right and left hand ends of this frame 12 being provided with upper and lower vertically alined bearings 13 and 14. A pair of vertical standards 15 which are supported by wheels 16, are rotatably received in the bearings 13 and 14, and in the present disclosure, provision is made for sliding said bearings along the standards to effect vertical adjustment of the front end of the frame 8.

Each standard 15 is provided with a forwardly projecting steering arm 17 and with a rearwardly projecting steering arm 18, the two front arms being connected by a front, transverse tie-bar 19, while the rear arms 18 are connected by a rear tie-bar 20. A central, longitudinal bar 21 is pivoted on a vertical axis 22 to the tie-bar 19 and is similarly pivoted at 23 to the rear tie-bar 20, and a tongue 24 may be suitably connected with the front end of this bar 21, or the latter may be directly hitched to a tractor. In either instance, when it is horizontally swung about a vertical axis midway between the pivots 22—23, steering of the machine will be effected. When the machine is to be horse-drawn and the tongue 24 used, a doubletree or the like 25, having singletrees 26, may well be connected to the frame 12 and suitably braced thereto.

I provide a pair of rearwardly diverging pull rods 27 whose front ends are connected by a vertical pivot 28 with the point of the bar 21, about which the latter swings when steering. The rear ends of these rods are suitably anchored to the frame 8, and in the present disclosure, they pass through lugs 29 on the bearings 11, being secured with regard to said lugs, by appropriate nuts or the like 30.

When effecting extremely short steering, the pivot 28 and the standards 15 are received in recesses 31 formed in the tie-bars 19 and 20, as will be clear from Figs. 4 and 7. Hence, the machine may be turned in a much smaller space than would otherwise be possible.

Attention is invited to the fact that when the machine is pulled by a tractor or in any other way, placing the pull upon the bar 21, forward springing of the standards 15 under the strain of this pull, or possible distortion of the front portion of the frame, is prevented by the pull rods 27, which transmit the strain of the pull solidly to the rear portion of the main frame 8.

32 designates an auxiliary frame whose front end is pivoted at 33 to the frame 12. The rear end of this frame 32 is connected by links 34 with crank arms 35 on a rock shaft 36, this rock shaft being mounted in appropriate bearings on the frame 8. Shaft 36 is provided with additional arms 37 which have adjustable pivotal connections with the rear ends of links 38, the front ends of these links being pivoted to levers 39 which extend rearwardly and downwardly from and are pivoted to a pair of caps 40 on the upper ends of the standards 15. These levers are suitably connected with the front portion of the frame 8, for instance by links 41. By this relation of parts, a rearward pull upon a hand lever 42, with which the shaft 36 is provided, will simultaneously actuate the levers 39 to raise the front portion of the frame 8, and operate the links 34 to upwardly swing the rear end of the auxiliary frame 32. Forward movement of lever 42 will of course effect lowering of both frames.

For holding the lever 42 in adjusted position, any desired means may be provided. A hand-released dog 43 and a co-operating rack 44 have been shown for this purpose, the rack being pivoted at 45 to an upward extension 46 at the rear end of the frame 8. Upon this extension, the usual seat (not shown) may be mounted.

The adjustable pivotal connection between each link 38 and the associated arm 37, is preferably of the construction shown in Figs. 1, 2 and 2ª. An auxiliary lever 42ª is fulcrumed at 37ª to the arm 37 and is pivoted at 38ª to the rear end of link 38, said lever having a suitable pawl 42ᵇ for engagement with a rack 37ᵇ secured to the arm 37. By this arrangement, the links 38 may be moved forwardly or rearwardly to some extent, independently of the movement of the arms 37 and the shaft 36 under the influence of the main hand lever 42. Thus, the front end of the frame structure may be bodily raised or lowered as occasion may demand, without effecting any swinging of the auxiliary frame 32 about its pivot 33.

47 merely denotes fallowing and seed-dropping implements carried by a transversely elongated frame 48 forming part of the frame 32. Preferably, two seed hoppers are mounted on this frame 48, for supplying seed to the rear and front rows of implements 47, but as the present application is not concerned with any seed-dropping means, only one hopper 49 has been illustrated. When lever 42 is operated to move the frames 32 and 8 upwardly, the implements 47 are raised out of the ground, as shown in Fig. 1.

On account of the advantages existing for the general construction herein disclosed, such construction is preferably followed. However, within the scope of the invention as claimed variations may be made.

While only four wheels have been shown on the axle 10, there are preferably two behind each implement 47.

I claim:—

1. In a portable machine, a pair of front wheels, two vertically elongated standards supported by said wheels, a forwardly projecting steering arm and a rearwardly projecting steering arm on each of said standards, a front transverse tie bar pivoted to the front steering arm, a rear transverse tie-bar pivoted to the rear steering arm, a frame whose front end is spaced above said steering arms and said tie-bars and provided with bearings rotatably receiving said standards, a central longitudinal bar crossing and projecting forwardly from said tie-bars, means pivoting said central bar and said tie-bars together, rods diverging rearwardly from said central bar and secured at their rear ends to said frame, and means pivoting the front ends of said rods to said central bar at a point midway between said tie-bars.

2. In a portable machine, a pair of front wheels, two vertically elongated standards supported by said wheels and projecting upwardly to points above the same, a forwardly projecting steering arm and a rearwardly projecting steering arm on the lower portion of each of said standards, a front transverse tie-bar pivoted to the front steering arm, a rear transverse tie-bar pivoted to the rear steering arms, a frame whose front end is spaced above said steering arms, above said tie-bars and above said wheels, said frame being provided with bearings rotatably receiving said standards, a central longitudinal bar crossing and projecting forwardly from said tie-bars, means pivoting said central bar and said tie-bars together, rods diverging rearwardly from said central bar and secured at their rear ends to said frame, and means pivoting the front ends of said rods to said central bar at a point midway between said tie-bars.

In testimony whereof I have hereunto affixed my signature.

WILLIAM EVERSON.